April 16, 1957 J. TAÏEB 2,789,163

ELECTRONIC AMPLIFYING SYSTEMS

Filed March 31, 1952

Inventor: Joseph Taïeb;
By his attorneys,
Baldwin + Wight

United States Patent Office 2,789,163

Patented Apr. 16, 1957

2,789,163

ELECTRONIC AMPLIFYING SYSTEMS

Joseph Taïeb, Paris, France, assignor to Commissariat a l'Energie Atomique, Paris, France, a corporation of France Application March 31, 1952, Serial No. 279,665

Claims priority, application France April 7, 1951

4 Claims. (Cl. 179—171)

The present invention concerns electronic amplifiers and more particularly low frequency amplifiers for the amplifying of low currents supplied by a source with a high internal resistance.

It is known that electronic amplifiers amplify, together with the input signal introduced as a voltage or as a current, parasite currents or voltages called noises. In the case of low frequency amplifiers designed for the amplification of low currents supplied by a source with a high internal resistance, the input noise, expressed as a current, consists of two main terms, namely the grid current of the input tube of the amplifier, or its fluctuations, according to the frequency band which is amplified, a term which, for a given frequency band, is independent of the value of the input resistor, and the thermal agitation noise in the input resistor, which appears as a current through said input resistor, a current which is inversely proportional to the square root of the value of that resistor.

In case of very low intensity signals being amplified, the signal/noise ratio may be too low to enable suitable discrimination of the output signal from the noise. This offers a serious drawback, particularly in devices designed for detecting low intensity signals such as those resulting from the operation of a mass spectrograph or an ionization chamber for instance.

One object of the present invention is to provide an improvement in low current amplifiers, which enables the signal/noise ratio to be improved in these amplifiers and, consequently, their sensitivity increased.

The input signal in such amplifiers is a current which is independent of the input resistance of the amplifier. On the contrary, as explained above, one of the two main terms concerning the input noise decreases when the value of said resistance increases.

The input signal/noise ratio and consequently the output ratio in low frequency amplifiers can thus be improved under the condition of increasing the input resistance on the one hand and, on the other hand, of decreasing the grid current in the input tube and its fluctuations by a suitable choice of the type of said tube, which decreases, at the same time, the two main terms of the input noise, without acting on the signal.

However, in case of an input circuit of a conventional type being used, the increase in the input resistance determines an increase in the time constant of the input circuit, and therefore in the time necessary for the measurement. The increase in the value of the input resistance is thus limited by a consideration of the time which is necessary for measurements.

It may be shown that the use of a negative feedback circuit makes it possible to decrease the time constant of the input circuit which may be written $$(1)\qquad \tau=R\left(\frac{C_1}{A}+C_0\right)$$

provided $$(2)\qquad \Gamma<\frac{C_1}{A}+C_0$$

In the above relationships, $C_1$ is the input capacity of the amplifier, $C_0$ is the capacity across terminals of resistor R, $\Gamma$ the sum of the distributed capacities along this resistor and A is the gain, in voltage, of the chain formed by the amplifier and the negative feedback circuit.

These relationships show that the negative feedback makes it possible, by the choice of a sufficiently high amplifier gain, to decrease the term $$\frac{C_1}{A}$$

at will but that it remains without any effect on the terms $C_0$ and $\Gamma$.

On the other hand, except for very rare exceptions, the term $\Gamma$ is much smaller than $C_0$, and therefore smaller than $$\frac{C_1}{A}+C_0$$

In order to substantially improve the signal/noise ratio and therefore the sensitivity in an amplifier with a negative feedback circuit, by using an input resistance which is of a much higher value than in conventional amplifiers, without increasing, at the same time, in an inacceptable manner, the time constant of the input circuit, it is necessary, therefore, to decrease the value of the above mentioned $C_0$ term. The possibility of such decrease is limited only by the existence of the term $\Gamma$ and the necessity of satisfying the Equation 2.

The improvement which is an object of the present invention precisely provides this result, in reducing, to an extremely low value, the capacity across the terminals of the input resistor of the amplifier.

The invention fundamentally consists in arranging, around the input resistor of the amplifier and in a plane perpendicular to the axis of said resistor, a plane grounded conducting screen, which is insulated with respect to the resistor.

According to a particularly advantageous embodiment, a thick screen or shield is used, resiliently suspended, for simultaneously supporting both the input resistor which perpendicularly passes through it, and the input tube of the amplifier. This shielding constitutes in itself a heavy base which decreases the microphonic effect in the amplifier.

The invention is described in greater detail hereinafter with reference to the accompanying drawing, in which.

Figure 1:
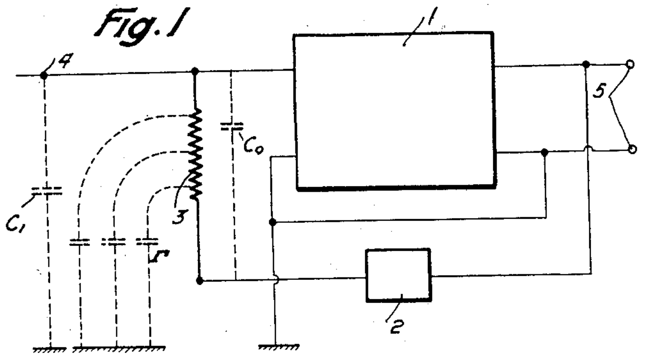
Fig. 1 is circuit diagram of an amplifier of the conventional type, comprising a negative feedback circuit.

In the diagram of Fig. 1, reference character 1 designates an amplifier with a gain $\mu$, associated with a negative feedback circuit 2, providing a gain $\beta$. The input resistor for the amplifier, of a value R is shown at 3. In addition, the input capacity $C_1$ of the amplifier, the capacity $C_0$ across the terminals of resistor 3 and the sum $\Gamma$ of the distributed capacities along resistor 3 appear in dotted lines.

The current $i_0$ to be amplified is applied to the input terminal 4 of the amplifier, and the amplified voltage $U_s$ is obtained at the output terminals 5 thereof.

As explained above, the term $$\frac{C_2}{A}$$

in Equation 1 may be made as small as desired, by determining the characteristics of amplifier 1 and of the negative feedback circuit 2 in such a manner that the gain $A=\mu\beta$ of the chain consisting of the amplifier 1 and the circuit 2 is sufficiently high with respect to $C_1$.

Figures 2, 3, 4:
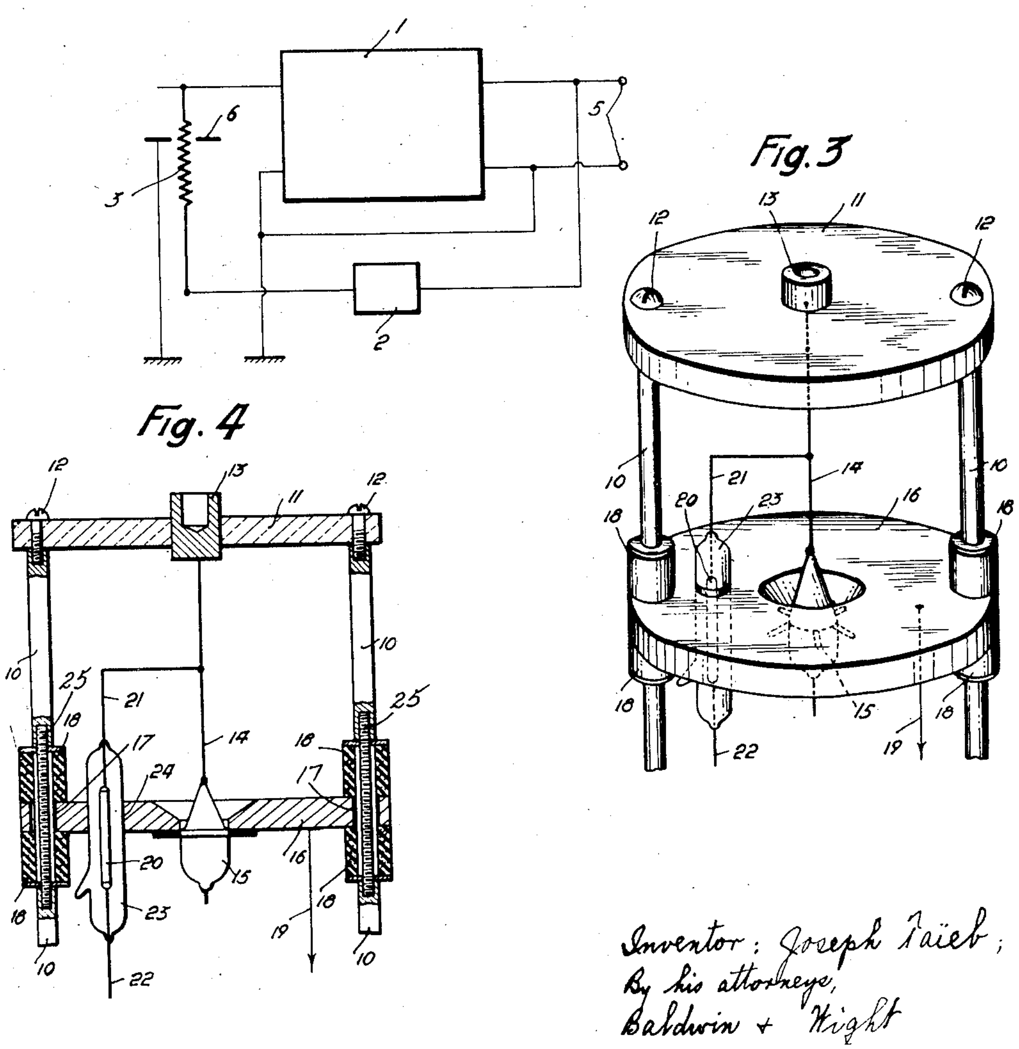
Fig. 2 is a similar diagram of an amplifier improved according to the present invention.
Fig. 3 is a partial perspective view, of an example of an embodiment of an amplifier according to the present invention.
Fig. 4 is a partial vertical sectional view of the embodiment of the amplifier shown in Fig. 3.

In the apparatus according to the invention, schematically shown in Fig. 2, in which the same reference numerals designate the same members and elements as in Fig. 1, a flat grounded shield 6, is arranged around the resistor 3 perpendicularly to the axis of the latter. This shield permits of the possibility of practically reducing $C_0$ to zero.

Figs. 3 and 4 show the input elements of an amplifier according to the invention. These elements are supported by two small pillars 10, connected at their upper portions by an insulating plate 11, secured to the ends of said pillars by means of screws 12 and carrying the input terminal 13 of the amplifier. Said terminal is connected through a conductor 14 to the input tube 15, which is supported by a thick metal shield 16. In order to simplify the drawing, the inner elements and the circuit connections of tube 15 have not been represented. In the vicinity of the edge of shield 16 there are provided two holes 17, diametrically opposite, through which pass the two screw threaded rods 25 supported at opposite ends by the pillars 10, the shield 16 being held in position on the latter by sponge rubber rings 18 which surround the rods 25 and establish end supports for opposite faces of the shield 16. The shield 16 resiliently floats on the rubber rings 18. Said shield is grounded by a flexible conductor 19 which connects it to the ground terminal of the amplifier.

The input resistance 20, connected, on the one hand, through a conductor 21, to the input terminal 13 and, on the other hand, through a conductor 22 to the negative feedback circuit, not shown, is enclosed in a glass envelope 23 supported in a cylindrical bore 24 in shield 16.

Shield 16 constitutes at the same time the shield according to the invention, for reducing to zero or to a minimum the capacity $C_0$ across terminals of resistor 20, a shielding which perfectly insulates the input circuit from the other circuits of the amplifier and in so doing, prevents the disturbing actions of these circuits on the input circuit and also provides a heavy base for tube 15 in which the microphonic effect is thus decreased.

By way of example of an embodiment of the invention, a negative feedback circuit amplifier has been used in which the total gain of the chain formed by the amplifier and feedback circuit was equal to 500, the input tube of the amplifier being a "954" tube mounted as a pentode, the usual precautions having been taken in order to prevent disturbing effects on the input circuits.

With an input resistor of 500 MΩ, the width of the pass band, without a shield according to the invention, was 300 cycles per second, whereas with a set of the conventional type without any negative feedback, it would have been of the order of 20 cycles per second. By arranging a screen in accordance with the invention, the width of the pass band has been extended to 6700 cycles per second, the total noise at the input, expressed as a current being (1.1) $10^{-12}$ amp. R. M. S. value.

With a resistor of 1000 MΩ it was possible, by arranging a shield according to the invention, to increase the width of the pass band from 10 cycles per second (conventional set), up to 4300 cycles per second, the total noise at the input being $10^{-12}$ ampere R. M. S. value.

What I claim is:

1. An electronic amplifying system for low currents, comprising an amplifier tube having an input grid and an output circuit, a negative feedback circuit connected between said output circuit and said input grid, a resistor interposed between said feedback circuit and said input grid, the said resistor being of very high ohmic value and having a rectilinear longitudinal axis, a plane conductive shield, insulating supporting means connecting said resistor to said shield with said shield disposed around said resistor between and spaced from the ends of said resistor, the plane of said shield being substantially perpendicular to the axis of the said resistor, and means for connecting the said shield to earth.

2. An electronic amplifying system for low currents, comprising an amplifier tube having an input grid and an output circuit, a negative feedback circuit connected between said output circuit and said input grid, a resistor interposed between the said feedback circuit and said input grid, said resistance being of very high ohmic value and having a rectilinear longitudinal axis, a plane conductive shield disposed around and supporting said amplifier tube, insulating supporting means connecting said resistor to said shield with said shield disposed around said resistor and spaced from the ends of said resistor, the plane of said shield being substantially perpendicular to the longitudinal axes of said resistor and said tube, and means for connecting the said shield to earth.

3. An amplifying system as set forth in claim 2, in which the said plane conductive shield is resiliently supported in a chassis by means of elastic members.

4. An amplifying system as set forth in claim 2 and comprising a chassis, at least two pillar members fast with said chassis, elastic means for resiliently supporting said plane conductive shield on said pillar members, said shield having an aperture formed therein for fixing thereto the said resistor of very high value, with its axis perpendicular to the plane of said shield, said shield having a second aperture formed therein for mounting therein the said amplifier tube, having its input grid connection and its output connections on opposite sides of the said shield, means for connecting the said input grid to the terminal of said resistor located on the same side of the said shield as the said input grid, means for interposing a negative feedback circuit between said output circuit and the other terminal of said resistor, and means for connecting the said shield to earth.

References Cited in the file of this patent

UNITED STATES PATENTS

| | | |
|---|---|---|
| 1,798,012 | Cohen et al. | Mar. 24, 1931 |
| 2,033,274 | Burton | Mar. 10, 1936 |
| 2,536,617 | Weller | Jan. 2, 1951 |
| 2,579,820 | Haller et al. | Dec. 25, 1951 |
| 2,598,259 | Hogue | May 27, 1952 |
| 2,623,996 | Gray | Dec. 30, 1952 |